United States Patent [19]

Dalkov

[11] 4,111,431
[45] Sep. 5, 1978

[54] RECORD PLAYER WITH RECORD DETERMINING MEANS

[75] Inventor: Poul Flemming Dalkov, Nivaa, Denmark

[73] Assignee: Skandinavisk Radio & Television Akts., Hasselager, Denmark

[21] Appl. No.: 780,455

[22] Filed: Mar. 23, 1977

[30] Foreign Application Priority Data

Apr. 1, 1976 [DK] Denmark ............................. 1586/76

[51] Int. Cl.² .................................................. G11B 25/04
[52] U.S. Cl. .................................. 274/9 A; 274/10 S
[58] Field of Search ..................... 274/10 S, 9 A, 9 R

[56] References Cited

U.S. PATENT DOCUMENTS 2,632,650  3/1953  Offutt ................................. 274/9 A
3,485,499  12/1969  Fukuda ............................. 274/9 A

FOREIGN PATENT DOCUMENTS 77,412  3/1960  France ................................. 274/9 A
1,215,253  11/1959  France ................................. 274/9 A Primary Examiner—Harry N. Haroian
Attorney, Agent, or Firm—Hume, Clement, Brinks, Willian & Olds, Ltd.

[57] ABSTRACT

A record player having a centrally located record presence and record size sensor is disclosed. The record presence and size detector includes biasing elements and switching elements which are sensitive to record weight for sensing the presence of a record on the turntable and the size of the record.

10 Claims, 6 Drawing Figures

RECORD PLAYER WITH RECORD DETERMINING MEANS

SUMMARY OF THE INVENTION

The invention concerns a record player having a sensor that is central to the turntable, which sensor is vertically displacable from an upper position maintained in the case of no record being present being present on the turntable to a lower position by means of the weight of a record put on the turntable, and having a switch in series in the motor circuit, which switch is closed when the sensor is in its lower position.

Record players of the kind mentioned are known from for instance U.S. Pat. No. 2,621,047 and from British Pat. No. 616,469. Both these patents describe record players in which the central sensor only acts on a switch in series in the motor circuit, which switch is closed in case no record is present on the turntable. From the British patent mentioned further means are known that determine the diameter of a gramophone record that has been put on the turntable.

It is the purpose of the present invention to provide an improved record player in which the central sensor is further used for the determination, by means of weighing, of the size of the record put on the turntable, i.e. whether it is a 17 cm (7 inch) record or a larger record, for instance a 30 cm (12 inch) record. The indication obtained of the record size enables the record player to make the appropriate changes in its mode of operation as regards the positioning of the pick-up with respect to the grooves and the speed of revolution of the turntable.

According to the invention this is obtained by means of an arm carrying a spring, which spring, at least for a short interval of time, may be moved from a lower to a higher position, in which the spring exerts a force on the sensor that is greater than the weight of a 17 cm record and smaller than the weight of a 30 cm record.

Thus the sensor performs a weighing operation on the record resting on the turntable, as a result of which the record player is adjusted to the correct positioning of the pick-up and the correct speed.

A preferred embodiment of the invention makes use of a logic circuit, i.e. a circuit that may be in any one of two states possible, which logic circuit is designed to detect, during the period of time in which the spring acts on the sensor, whether the switch is opened for a short time or not and accordingly to change the speed of the turntable or the positioning of the pick-up or both, from the values that are proper for a 30 cm record to the values that are proper for a 17 cm record.

In still another embodiment of the invention the arm is maintained in a position such that an upper end washer used for pre-tensioning the spring only just touches the undersides of the prongs of the sensor, which position corresponds to a 17 cm record resting on the turntable, there being provided a pivotally mounted second arm, which arm senses the position of the end washer and thereby changes the speed of the turntable and the positioning of the pick-up from the values that are proper for a 30 cm record to the values that are proper for a 17 cm record.

BRIEF DESCRIPTION OF THE DRAWINGS

The invention will be further described with reference to the drawing, in which.

DETAILED DESCRIPTION OF THE INVENTION

Figure 1:
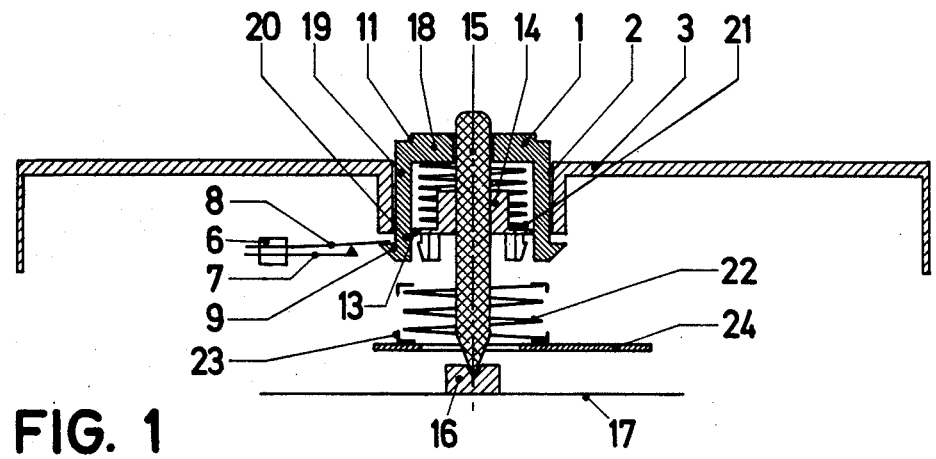
FIGS. 1–6 show vertical sections through various embodiments of the invention.

On FIGS. 1–5 3 is the turntable of a record player for the playing of gramophone records by means of a pick-up, not shown, which pick-up may be positioned at the beginning of the record 10, 12 into the lead-in grooves by means of known provisions, not shown here.

The turntable 3 has a central well 2 with a bottom 13 that carries a bushing 14 shrunk onto the spindle 15. The spindle 15 is supported by a journal bearing 16 that is fixed to the body of the record player 17 and by a sleeve bearing, not shown for the sake of clarity. The sleeve bearing is carried by a tube fixed to the body 17 and is supporting the spindle close to the underside of the bottom 13 of the turntable well 2. The record player is equipped with a motor, also not shown, that will rotate the turntable 3 with speeds of 45 to 33⅓ rpm depending whether the record resting on the turntable is a 17 cm record or a 30 cm record.

The diameter of the well 2 is such that a sensor may move freely and axially in the well. The sensor 1 consists of a circular disc 18, a cylindrical skirt 19 ending in prongs 20 that pass through holes in the bottom 13, each prong ending in a protrusion, the upper part of which is at right angles to the prong and the lower part of which is cut obliquely. These provisions make it easier to guide the sensor 1 into the well 2 flexing the prongs 20 towards the spindle and straightening them out after passage of the holes in the bottom 13 of the well, in this way preventing the sensor from falling out by itself. The spindle 15 passes through a clearance in the disc 18.

Between the bottom 13 and the disc 18 a spring is mounted, having an initial tension such that is exerts a force $p$ on the sensor 1 that is smaller than the weight of a 17 cm record 10 (FIG. 2) and consequently smaller than the weight of a 30 cm record 12 (FIG. 3) as well, but greater than the sensor without a record (FIG. 1).

An electrical switch 6, 7, 8 consists of an insulated block 6 that is fixed to the body 17 of the record player an an appropriate level so as to enable the horizontal surfaces of the protrusions 9 to lift a moveable contact spring 8 out of contact with a fixed contact 7, provided the sensor 1 is in its topmost position. The switch is series connected to the turntable motor and to a mains switch not shown. The moveable contact spring 8 is wider than the distance between adjacent protrusions 9.

A spring 22 is pre-tensioned by means of end washers 23 to exert a force P having a value such that the sum of the forces $p + P$ is greater than the weight of a 17 cm record and smaller than the weight of a 30 cm record. The spring 22 rests with its lower end against an arm 24 that is upwards moveable from the position shown in FIG. 1 to the positions shown in FIGS. 4 and 5.

The record player shown on FIGS. 1 through 5 works in the following manner: In case there is no record present on the turntable 3 the spring 21 will lift the sensor 1 to its topmost position, as shown on FIG. 1. The protrusion 9 lifts the moveable contact spring 8 out of contact with the fixed contact 7, whereby the turntable motor is unable to start even though the main switch is closed. As the operation of the record player requires the power of the motor unintentional starting of the turntable is avoided.

Figure 2:
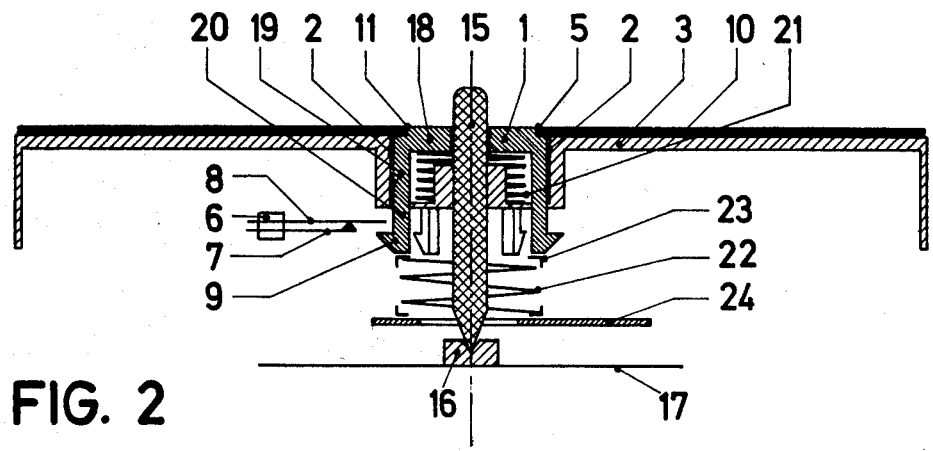
Figure 3:
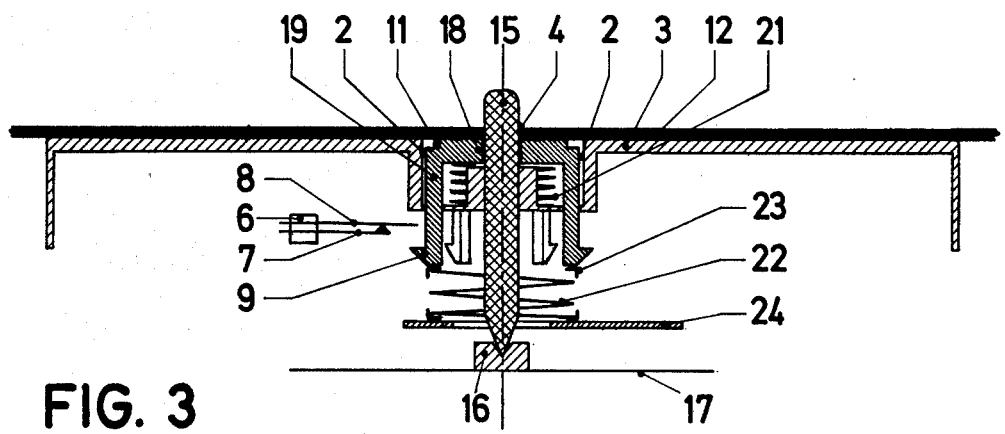

If a 17 cm record 10 as shown on FIG. 2 or a 30 cm record 12 as shown on FIG. 3 is put on the turntable 3 the manner of operation is as follows: The sensor 1 will be depressed into the well 2 so that the record rests on the turntable proper, because the spring 21 is pre-tensioned to exert a force that is smaller than the weight of the lightest record. As shown on FIG. 2, a 17 cm record 10 is centered by means of the upper part 11 of the sensor 1; this, however is still depressed sufficiently into the well 2 that the protrusion 9 permits the moveable contact spring 8 to touch the fixed contact 7. In FIG. 3, a 30 cm record 11 is shown to depress the sensor 1 one record thickness further down into the well 2. Also in this case the contact 6, 7, 8 is closed. This provision ensures that the record player may be started when a record is resting on the turntable.

In the following and with reference to FIGS. 4 and 5 the manner is described, in which the record player according to the invention is enabled to distinguish between records having diameters of 17 and 30 cm respectively.

Figure 4:
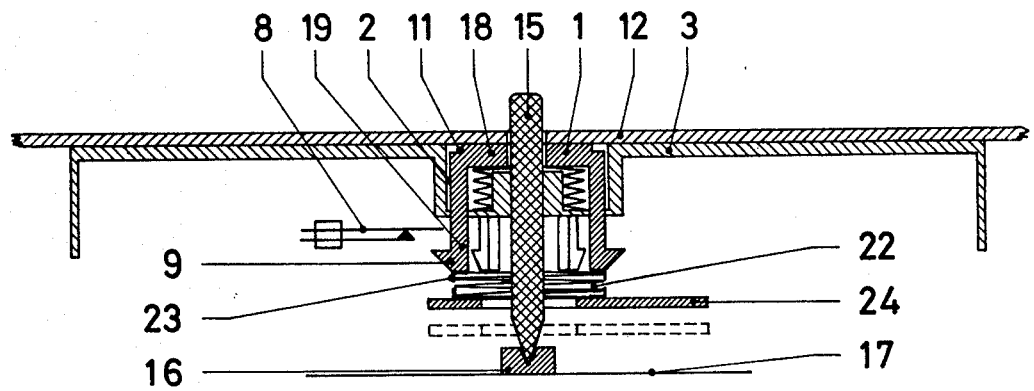

In FIG. 4 a 30 cm record 12 is shown resting on the turntable 3. According to the explanation given above, the record, having a weight that is greater than the force $p$ of the spring 21, will compress the same until the record rests on the turntable proper. In consequence the protrusions 9 are lowered, and the moveable contact spring 8 touches the fixed contact 7, enabling the turntable motor to start. The record player is equipped with a well known cam mechanism that will position the pick-up to the lead-in grooves of the record. The cam mechanism, which is not shown, according to the invention moves the arm 24 upwards to the position shown on FIG. 4. In this way the spring 22 exerts an upwards force P adding to the force $p$ of the spring 21 on the sensor 1, but since the combined force is less than the weight on a 30 cm record, this latter will not be lifted. In this work-interval of the record determining mechanism a not shown logic circuit tests for a short-duration breaking of the electrical connection through the switch 6, 7, 8. In case the connection is not broken the record player remains in its normal mode of operation in which the turntable rotates with 33⅓ rpm and in which the pick-up is positioned at the lead-in grooves of a 30 cm record.

Figure 5:
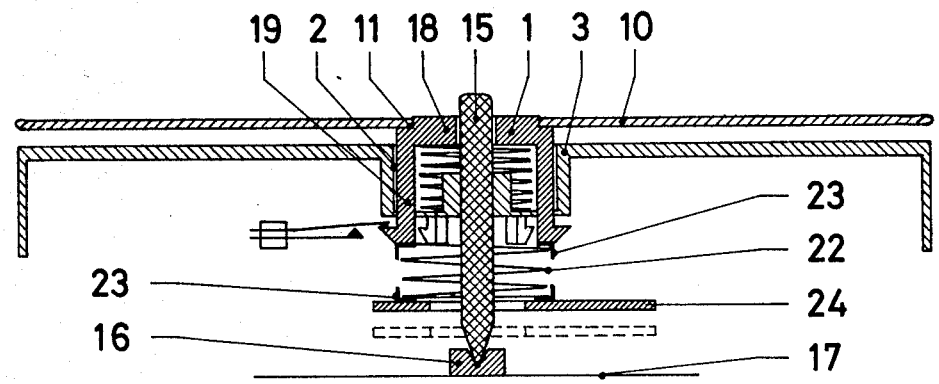

If, on the other hand, a 17 cm record 10 is put on the turntable as shown on FIG. 5, this record having a weight that is less than the force $p + P$, will be lifted a short distance upwards from the turntable by the sensor 1 so that the switch 6, 7, 8 breaks the connection as described above. This condition is detected by the previously mentioned logic circuit which causes the record player to change from its normal mode of operation to 45 rpm and a positioning of the pick-up suitable for a 17 cm record. Concurrently the arm 24 is lowered again and the temporarily lifted 17 cm record is lowered onto the turntable proper.

Figure 6:
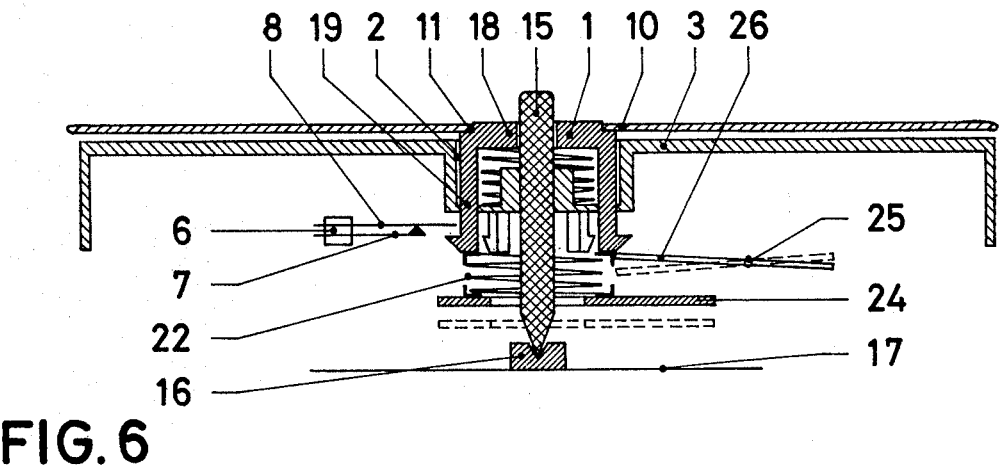

On FIG. 6 an embodiment of the invention is shown, in which the determination of the presence of a record and determination of the type of record occur simultaneously, whereby the arm 24 is maintained in a position such that an upper end washer 23 used for pre-tensioning the spring 22 only just touches the prongs 9 of the sensor 1, which position corresponds to a 17 cm record resting on the turntable 3 there being provided a pivotally mounted second arm 26, which arm senses the position of the end washer 23 and thereby changes the speed of the turntable and the positioning of the pick-up from the values that are proper for a 30 cm record to the values that are proper for a 17 cm record. All the details shown on FIG. 6 are identical to those shown on the other figures, except for the arm 24 being brought to its lifted position when the turntable is shut off. As a result the sensor 1 is enabled to be in three distinct positions: An upper position in which the spring 21, as shown on FIG. 1, lifts the sensor 1 so that the switch 6, 7, 8 prevents the turntable motor from being started; an intermediary position as shown on FIG. 6, corresponding to the presence of a 17 cm record heavy enough to compress the spring 21 but not heavy enough to compress the spring 22 as well; and a lower position to be more fully described in the next paragraph. In the intermediary position an arm 26 which is pivotable on a rod 25 will cause by mechanical means change in mode of operation previously mentioned using a logic circuit. As described above the light-weight record is lowered onto the turntable proper as soon as the change in mode of operation has taken place.

In case a heavy (30 cm) record is present on the turntable, both springs 21 and 22 are compressed, so that the sensor 1 will be in its lower position in which the switch 6, 7, 8 is closed, and in which the arm 26 is brought to touch the underside of the protrusions 9 by means of a spring, not shown, that acts on the arm 26 to turn it clock-wise. In this position of the arm 26 no change in the mode of operation is caused, and the record player will immediately start the playing of the record.

In case the record player according to the invention is to be used for the playing of records having other characteristics than ordinary 17 or 30 cm records, for instance extremely light-weight records, the automatic mode selection may still be made to work properly by means of a disc-shaped weight having a hole that passes over the spindle 15.

On all the figures it is indicated that the upper part 11 of the sensor 1 has a slightly smaller diameter. This permits the sensor 1 to act as centering means for 17 cm records having a large center hole.

For a person skilled in the art it is obvious that wherever springs have been mentioned in this disclosure, any one or more of these within the scope of the invention, may be substituted for other elements, for instance permanent magnets. Equally within the scope of the invention one may substitute for the leaf-spring switch 6, 7, 8 any switch having a similar function, e.g. a Mercury switch. The sensor 1, instead of being manufactured in one piece and having protrusions 9 on the ends of the prongs 20, may be manufactured in two pieces and be provided with a circular groove instead of the protrusions 9 so as to avoid any noise that might ensue from contact with the moveable contact spring 8.

I claim:

1. In a record player having a turntable for individually supporting and rotating records of at least two different predetermined sizes, the combination comprising:

a vertically displaceable sensor centrally located with respect to the turntable;

sensor biasing means for maintaining said sensor in an upper position when no record is on the turntable, said sensor biasing means being of sufficiently low tension to allow said sensor means to be in a lower position when a record is on the turntable;

selectively actuable biasing means for being selectively actuated to provide an upward bias against said sensor, said selectively actuable biasing means exerting a biasing force on the sensor which is sufficient to upwardly displace said sensor only when a record of the smaller predetermined size is on the turntable and is not sufficient to upwardly displace said sensor when a record of the larger predetermined size is on the turntable and;

switching means responsive to the vertical displacement of said sensor.

2. The record player of claim 1 wherein said selectively positionable biasing means is positioned to exert a force against said sensor only for a predetermined time interval while a record is on the turntable.

3. The record player of claim 2 wherein said switching means is indicative of the presence of a record on the turntable.

4. The record player of claim 3 wherein said switching means is further indicative of whether said sensor is upwardly displaced by said selectively positionable biasing means, thereby indicating which predetermined size record is on the turntable.

5. The record player of claim 3 further including position sensing means independent of said switching means for indicating whether the force exerted by said selectively positionable biasing means on said sensor is sufficient to maintain said sensor in the upper position, thereby indicating which predetermined size record is on the turntable.

6. In an automatic record player having a horizontal turntable operable to receive records of any of a first or second type, of which the first type records are light and of small diameter while the second type records are of larger diameter and weight, said turntable having record support means defining a support level for the underside of a record for normal playing operation, the combination comprising:

record sensor means on said turntable so as to be substantially vertically displaceable between a first position projecting upwardly beyond said support level and a second position level with said support level;

lifting means selectively operable to temporarily exert on said sensor means a lifting force sufficient to cause said sensor means to move upwardly from said second position against the weight of an overlying record of said first type, thereby causing such a record to be lifted, but said lifting force being insufficient to cause lifting of a record of said second type;

detector means operable to detect the position of said record sensor means as subjected to said lifting force by said lifting means for providing an indication as to whether the record is of the first or second type, said detector means providing an indication that a record of the first type is present when said sensor means assumes said said first position and providing an indication that a record of the second type is present when said sensor means assumes second position.

7. An automatic record player according to claim 6 wherein said record sensor means includes a bushing member surrounding the center pin of the turntable.

8. An automatic record player according to claim 6 wherein said lifting means includes an actuator member operable at the start of play to be shifted from a first position to a second position and then back again to said first position, and spring means interposed between said actuator member and said sensor means, said spring means providing a bias force which is insufficient to cause lifting of a record of either first or second type when said actuator is in said first position and which is sufficient to cause lifting of a record of said first type but not said second type when said actuator is in said second position.

9. An automatic record player according to claim 8 wherein the actuator member is a generally horizontally disposed lever having one end thereof located underneath the record sensor means and cooperating with a vertically compressible spring member interposed between the top side of said end of the lever and a lower portion of said record sensor means.

10. An automatic record player according to claim 6 further including independent biasing means for providing an upward bias on said record sensor means independent of the lifting force of said lifting means said independent upward bias being capable of lifting said record sensor means only in the absence of a record.

* * * * *

UNITED STATES PATENT AND TRADEMARK OFFICE
CERTIFICATE OF CORRECTION

PATENT NO. : 4,111,431
DATED : September 5, 1978
INVENTOR(S) : Poul Flemming Dalkov It is certified that error appears in the above-identified patent and that said Letters Patent are hereby corrected as shown below:

Column 2, line 34 "is" should read --it--.

Signed and Sealed this

Fifth Day of June 1979

[SEAL]

Attest:

RUTH C. MASON
*Attesting Officer*

DONALD W. BANNER
*Commissioner of Patents and Trademarks*